United States Patent
Peterson

(10) Patent No.: US 9,360,961 B2
(45) Date of Patent: Jun. 7, 2016

(54) METHODS AND APPARATUS TO ASSOCIATE A DETECTED PRESENCE OF A CONDUCTIVE OBJECT

(75) Inventor: Jonathan Peterson, Everett, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 227 days.

(21) Appl. No.: 13/240,938

(22) Filed: Sep. 22, 2011

(65) Prior Publication Data
US 2013/0076643 A1 Mar. 28, 2013

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 2203/04104* (2013.01)

(58) Field of Classification Search
CPC .............. G06K 9/46; G06K 9/48; G06K 9/34; G06K 9/4604; G06K 11/06; G06T 7/0079; G06F 2203/04104; G06F 3/0488; G06F 3/0416; G06F 3/033; G06F 3/041; G06F 3/0412; G06F 3/04883; G02F 1/13338
USPC ................. 345/173–178; 178/18.06
See application file for complete search history.

(56) References Cited

U.S. PATENT DOCUMENTS

| 4,968,877 | A | * | 11/1990 | McAvinney et al. ......... 250/221 |
| 5,825,352 | A | * | 10/1998 | Bisset et al. .................. 345/173 |
| 7,646,378 | B2 | | 1/2010 | Hirshberg |
| 7,821,503 | B2 | | 10/2010 | Stephanick et al. |
| 7,877,707 | B2 | | 1/2011 | Westerman et al. |
| 2002/0015024 | A1 | * | 2/2002 | Westerman et al. .......... 345/173 |
| 2006/0026535 | A1 | | 2/2006 | Hotelling et al. |
| 2006/0238518 | A1 | | 10/2006 | Westerman et al. |
| 2007/0081726 | A1 | | 4/2007 | Westerman et al. |
| 2007/0097096 | A1 | | 5/2007 | Rosenberg |
| 2007/0265089 | A1 | | 11/2007 | Robarts et al. |
| 2008/0158169 | A1 | * | 7/2008 | O'Connor et al. ............ 345/173 |
| 2008/0211775 | A1 | | 9/2008 | Hotelling et al. |
| 2008/0309629 | A1 | * | 12/2008 | Westerman ............. G06F 3/038 345/173 |
| 2008/0309634 | A1 | | 12/2008 | Hotelling et al. |
| 2009/0128516 | A1 | | 5/2009 | Rimon et al. |
| 2010/0044121 | A1 | | 2/2010 | Simon et al. |
| 2010/0156818 | A1 | | 6/2010 | Burrough et al. |
| 2010/0192109 | A1 | | 7/2010 | Westerman et al. |
| 2010/0245286 | A1 | | 9/2010 | Parker |
| 2011/0037718 | A1 | | 2/2011 | Stephanick et al. |
| 2011/0074675 | A1 | | 3/2011 | Shiming et al. |
| 2011/0148770 | A1 | | 6/2011 | Adamson et al. |
| 2011/0205175 | A1 | * | 8/2011 | Chen .................. G06F 3/04883 345/173 |
| 2011/0261058 | A1 | * | 10/2011 | Luo ............................... 345/441 |
| 2013/0057479 | A1 | * | 3/2013 | Pasquero et al. ............. 345/173 |

OTHER PUBLICATIONS

International Search Report for the International Application No. PCT/US68187 dated May 1, 2012; 2 pages.
Written Opinion of the International Searching Authority for the International Application No. PCT/US68187 dated May 1, 2012; 4 pages.

* cited by examiner

*Primary Examiner* — Grant Sitta
*Assistant Examiner* — Amen Bogale
(74) *Attorney, Agent, or Firm* — Morgan, Lewis & Bockius LLP

(57) ABSTRACT

A method and apparatus determine a plurality of attribute values of a first detected presence, determine another plurality of attribute values of a second detected presence, and associate the first detected presence with the second detected presence based on the plurality of attribute values and the other plurality of attribute values.

18 Claims, 9 Drawing Sheets

| DETECTED PRESENCE | ID | ATTRIBUTES ||||||  SIMILARITY VALUE |
|---|---|---|---|---|---|---|---|---|
| | | WIDTH | HEIGHT | MASS | PEAK | X-POS | Y-POS | |
| 7<br>51 62<br>24 8<br>211 | 1 | 2 | 3 | 152 | 62 | 16 | 76 | 4.23 |
| 15 28<br>24 51<br>215 | 2 | 2 | 2 | 118 | 51 | 36 | 81 | 3.98 |
| 21<br>21 51<br>217 | 3 | 2 | 2 | 93 | 51 | 57 | 52 | 2.71 |
| 53 63<br>23 15<br>213 | 4 | 2 | 2 | 154 | 63 | 28 | 84 | 5.00 |

*FIG. 7*

METHODS AND APPARATUS TO ASSOCIATE A DETECTED PRESENCE OF A CONDUCTIVE OBJECT

TECHNICAL FIELD

The subject matter relates to the field of interpreting user input. More specifically, but not by way of limitation, the claimed subject matter discloses techniques for associating multiple inputs of a conductive object.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device.

One type of user interface device that has become more common is a touch-sensor device or touch input device that operates by way of capacitance sensing. A touch-sensor device may be in the form of a touchscreen, touch-sensor pad, a touch-sensor slider, or touch-sensor buttons, and may include an array of one or more capacitive sensor elements. Capacitive sensing typically involves measuring a change in capacitance associated with the capacitive sensor elements to determine a presence or position of a conductive object relative to a touch input device. The conductive object may be, for example, a stylus or a user's finger.

Multiple detected touches of a finger or other conductive object may be used as input to initiate a user interface function. For example, a gesture for moving an object displayed through a user interface may be based on multiple detected touches. There are various techniques for associating detected touches of finger with one another; however, false positive associations and false negative excluded associations sacrifice proper functionality that would otherwise be available to a user.

BRIEF DESCRIPTION OF THE DRAWINGS

Some embodiments are illustrated by way of example and not limitation in the figures of the accompanying drawings in which:

FIG. 7 is a chart showing attribute values and a similarity value associated with multiple detected presences, in accordance with an embodiment;

DETAILED DESCRIPTION

Figure 1:
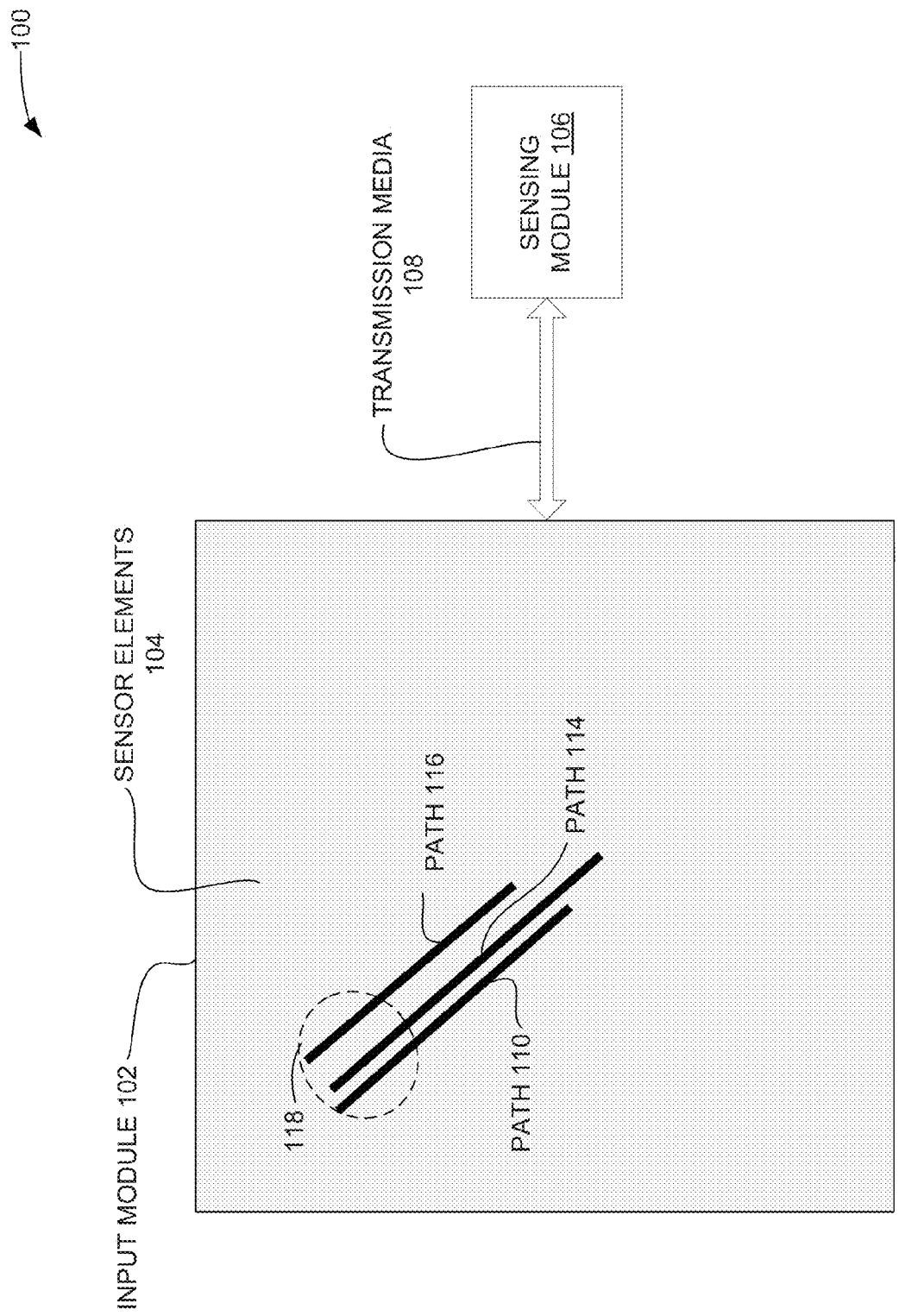
FIG. 1 is a block diagram illustrating an example capacitive sensing system, in accordance with various embodiments.

Methods and apparatus to associate a detected presence of a conductive object are discussed. In the following description, for purposes of explanation, numerous specific details are set forth in order to provide a thorough understanding of example embodiments. It will be evident, however, to one skilled in the art that the claimed subject matter may be practiced without these specific details.

The detailed description discloses examples of technology that, among other things, associates one detected presence of a conductive object with another detected presence of the conductive object. The conductive object may be a stylus, a finger, or any other conductive object that affects capacitance of a capacitive sensor element. The capacitive sensor element may be a part of a touchscreen, touchpad, or another input device from which changes in capacitance are detected.

Touch input can be used to initiate various user interface functions. For example, moving the thumb to the index finger on the surface of a touchscreen is a gesture commonly used to initiate a zoom function, to zoom-in on an image displayed through a user interface. In an embodiment, a capacitive sensing system can detect multiple fingers (e.g., finger touches) on a touchscreen at the same time. When one or more of these fingers move across the touchscreen, (e.g., moving the thumb to index finger on the surface of the touchscreen), the capacitive sensing system detects a series of touches along the respective paths taken by the one or more fingers.

Embodiments described herein track an individual finger as it moves across the touchscreen through determined similarities between the detected touches of the finger. For example, the capacitive sensing system determines that multiple detected touches (e.g., detected presences) are associated with the same finger because of similarities between the detected touches. For touches detected one after another, an embodiment includes calculating similarity values for previously detected touches relative to a subsequently detected touch. The similarity values represent a level of similarity between each previously detected touch and the subsequently detected touch. In an embodiment, the previously detected touch and the subsequently detected touch that are most similar, as indicated by the similarity values, are considered to be touches made by the same finger.

Touches made by the same finger may have similar characteristics, which the embodiments show, can be reflected by the similarity value. The characteristics of a touch can be described through multiple touch attributes. In various embodiments, touch attributes may include, but not be limited to, a two-dimensional or three-dimensional shape of the touch, capacitive sensor element signals associated with the touch, coordinate position of the touch, velocity associated with the touch, and/or orientation associated with the touch. Touch attributes may be determined at different times during touch detection and touch position calculation processes. For example, touch attributes may be determined before and/or after position of a touch is calculated.

In example embodiments, the similarity value reflects the level of similarity between attribute values of a previously detected touch and attribute values of a subsequently detected touch. The similarity value may be calculated by determining differences between each attribute value of the previously detected touch and a corresponding attribute value of the subsequently detected touch. In an embodiment, the similarity value, which can be used to associate or exclude association of the previously and subsequently detected touch, is based on the sum these determined differences.

A capacitive sensing system that accurately associates touches with one another provides for accurate representation of gestures and other touch input. Gestures and the like can be used as input to a variety of user interface functions of operating systems, drawing applications, business applications, game applications, industrial applications, or any other programs that can utilize the touch input described herein.

By describing touches with multiple touch attributes, false positive associations and false negative exclusion of associations are minimized. Taking the previously detected touch and the subsequently detected touch as an example, other tracking techniques may exclude their association because a distance between them exceeds a threshold distance. On the other hand, through embodiments described herein, since multiple attributes are used to describe the previously detected touch and the subsequently detected touch, their overall similarities can be recognized so that the previously and subsequently detected touches will be correctly associated.

The detailed description includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating an example sensing system 100, in accordance with various embodiments. The sensing system 100 is shown to include an input module 102 coupled to a sensing module 106. In various embodiments, the sensing system 100 may provide the functionality of a touchscreen, a touchpad, a slider, a button, a switch, a level sensor, a proximity sensor, a displacement sensor, a combination thereof, or provide some other functionality based on a detection of a user input.

The input module 102 is to receive input from an input object (not shown). In various embodiments, an input object may be a non-conductive object, a conductive object (e.g., a finger or stylus) and/or may emit light (e.g., to be sensed through the sensor elements 104). Multiple paths 110, 114, and 116 of one or more input objects are shown across the input module 102. The input module 102 is shown to include sensor elements 104. In various example embodiments, the sensor elements 104 may include one or more of light-sensitive elements, light emitting elements, photo-sensitive elements, pressure sensitive elements, and/or capacitive sensor elements. As discussed further below, the sensing module 106 uses signals from the sensor elements 104 to detect a presence of an input object, calculate a position of the input object, and/or determine a path (e.g., the path 110) of the input object.

In some embodiments, the input module 102 includes a touch pad, a touchscreen, or any other interface to receive input from an input object. The input module 102 may employ projected capacitive technology in which the sensor elements 104 are formed in one or more capacitive sensor layers upon a substrate (not shown) of the input module 102. For example, the sensor elements 104 may be patterned over an image display (e.g., a liquid crystal display) in one or more layers of transparent conducting film deposited on a glass substrate. A protective transparent layer (e.g., glass or plastic film) may cover the capacitive sensor elements to shield them from environmental damage. In some embodiments, the sensor elements 104 are embedded into the image display instead of in one or more transparent layers. This is sometimes referred to as in-cell sensing. For example, a photosensitive element may be embedded into each display pixel of the image display. The photosensitive element measures how much light is being reflected by an input object back into the cell.

In an embodiment, multiple input objects provide input to the input module 102. The input object may be fixed in position or moveable in position relative to the input module 102. For example, a user may move the input object relative to the input module 102. The user may include a human, a mechanism, a machine, and/or programmed instructions. Alternatively or additionally, the input module 102 may be allowed to move relative to a fixed or movable input object.

The sensing module 106 is to sense or detect whether one or more input objects are proximate to any of the sensor elements 104 of the input module 102. To this end, the sensing module 106 may sense, through the sensing elements, signals reflecting pressure applied to the input module 102 through the input object, light (e.g., infrared light) associated with the input object, images of the input object, and/or capacitances of the sensor elements when the input object is present. In an embodiment, the sensor elements 104 are capacitive sensor elements and the input object is a conductive object. The sensing module 106 may sense the effect of the conductive object on a capacitance associated with the sensor elements 104. In one embodiment, the sensing module 106 senses the conductive object through comparing a capacitance of a capacitive sensor element when the conductive object is not present (e.g., not proximate with a capacitive sensor element), with the capacitance of the capacitive sensor element when the conductive object is present. For some embodiments, to sense the presence of the conductive object, the sensing module 106 may perform a scan operation in which each of the sensor elements 104 are scanned for a change in capacitance. Alternatively or additionally, the sensing module 106 may scan sensor elements 104 for signals, responsive to the input object, reflecting pressure, light, and/or images.

In the scan operation to detect changes in capacitance, the sensing module 106 exchanges energy with the input module 102 through the transmission media 108. The transmission media 108 may include any medium through which the energy may be conveyed. For some embodiments, the transmission media 108 includes metal trace (e.g., copper wire) over which current can flow. Alternatively or additionally, the energy may be exchanged over a wireless transmission media. In one embodiment of a scan operation, the sensing module 106 applies a voltage to one or more of the sensor elements 104 through the transmission media 108 to form a capacitance. The sensing module 106 may alternatively or additionally detect a current or voltage resulting from a discharge of the one or more of the sensor elements 104. In various embodiments, the sensing module 106 may measure a self-capacitance of the sensor elements 104 and/or a mutual capacitance of the sensor elements 104.

For some embodiments, the sensing module 106 may process signals indicating the sensed changes in capacitance associated with a capacitive sensor element to calculate position of the conductive object relative to the input module 102. For example, the sensing module 106 may use the signals to detect the presence of the conductive object and perform further processing to determine the position of the detected presence of the conductive object. The sensing module 106 may use the determined position to detect movement, and/or to provide other presence related measurements associated with the conductive object. Alternatively or additionally, the sensing module 106 may provide the signals to other instructions and/or circuitry (e.g., instructions and/or circuitry of a host) to provide presence related measurements associated with the conductive object.

In an embodiment, the sensing module 106 can simultaneously detect the presence of multiple conductive objects at different locations on the input module 102. For example, the sensing module 106 may separately detect multiple fingertips when they are proximate to the surface of the input module 102 at the same time or overlapping periods of time. The sensing module 106 may also simultaneously calculate the position and/or movement of each fingertip. In an embodiment, the sensing module 106 determines the path 110, 114, and 116 of one or more conductive objects as they are moved relative to the input module 102.

The encircled portion 118 includes a portion of the paths 110, 114, and 116. As will be described in more detail with respect to the FIG. 2, each portion of the path 110, 114, and 116 within the encircled portion 118 includes multiple detected presences that the sensing module 106 associates with one another to recognize each path 110, 114, and 116.

When a user moves a conductive object relative to the input module 102, the multiple detected presences along the path of the conductive object (e.g., the path 110) may have similar characteristics such as similar shapes, dimensions, and velocities, among other characteristics. In an embodiment, a set of attributes of a detected presence are used to describe characteristics of the detected presence. An attribute value may represent a quality or quantity of an attribute. Examples of attributes are discussed below with respect to FIG. 5. In an embodiment, the sensing module 106 determines the path of a conductive object through associating detected presences with one another based on similarities between their attribute values.

Figure 2:
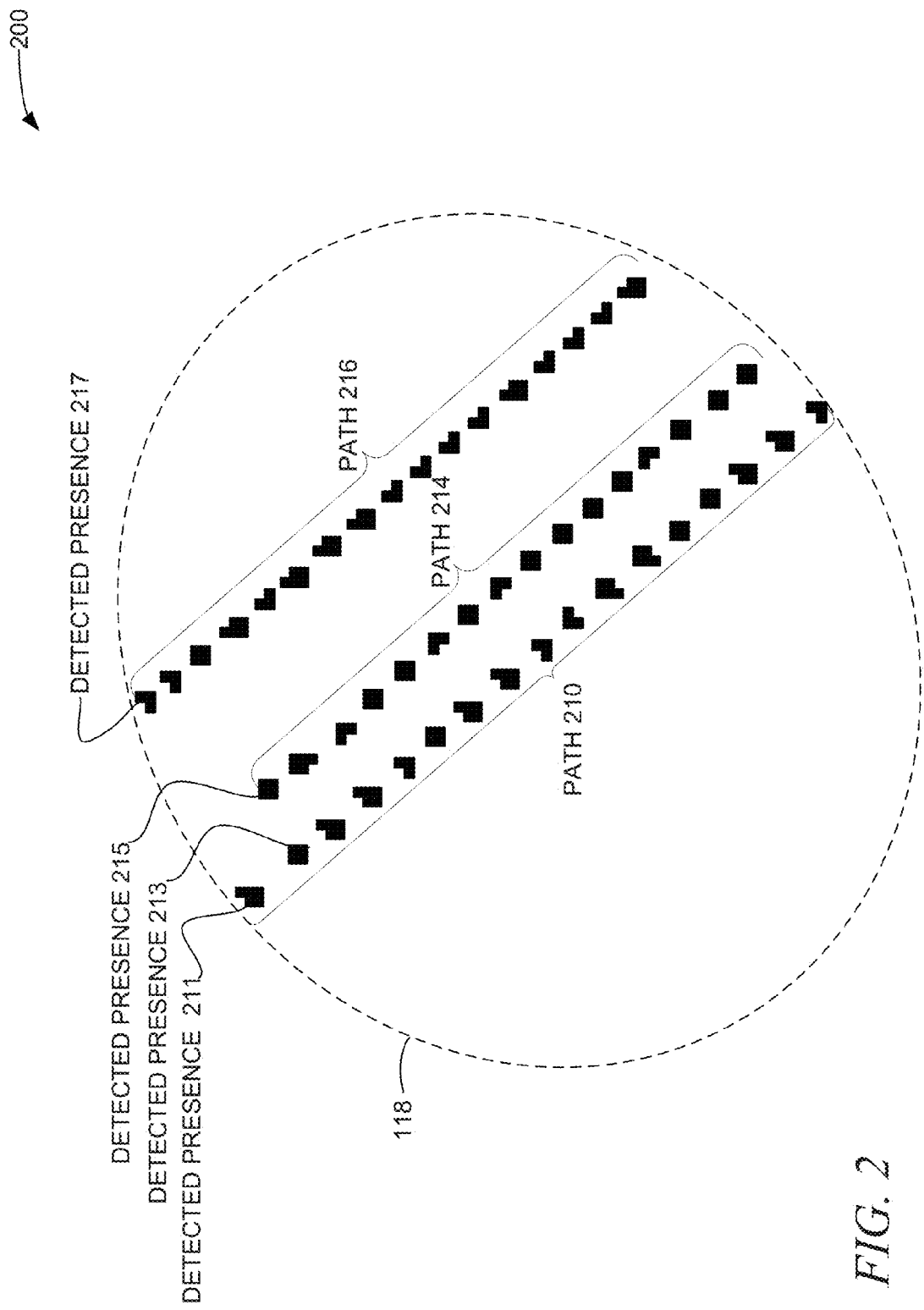
FIG. 2 is block diagram illustrating a portion of the paths of one or more conductive objects, in accordance an embodiment.

FIG. 2 is block diagram 200 illustrating a portion of the paths 110, 114, and 116 of one or more conductive objects, in accordance an embodiment. FIG. 2 is shown to include the encircled portion 118 of FIG. 1. Each path 110, 114, and 116 is composed of multiple detected presences, each detected presence represented by a darkened image having a shape. In an embodiment, the paths 110, 114, and 116 represent a user's movement of three fingers on the input module of FIG. 102. As the user moves the fingers down and across the input module, the presence of each fingers is repeatedly detected, but in different locations.

For example, the path 210 is shown to include multiple detected presences including a detected presence 211 and a detected presence 213. The path 214 is shown to include multiple detected presences including the detected presence 215 and the path 216 is shown to include multiple detected presences including the previously detected presence 217. As introduced above with respect to FIG. 1, the sensing module 106 uses attributes of the detected presences to determine the paths 110, 114, and 116 followed by the one or more conductive objects. The sensing module is discussed in more detail with respect to FIG. 3.

Figure 3:
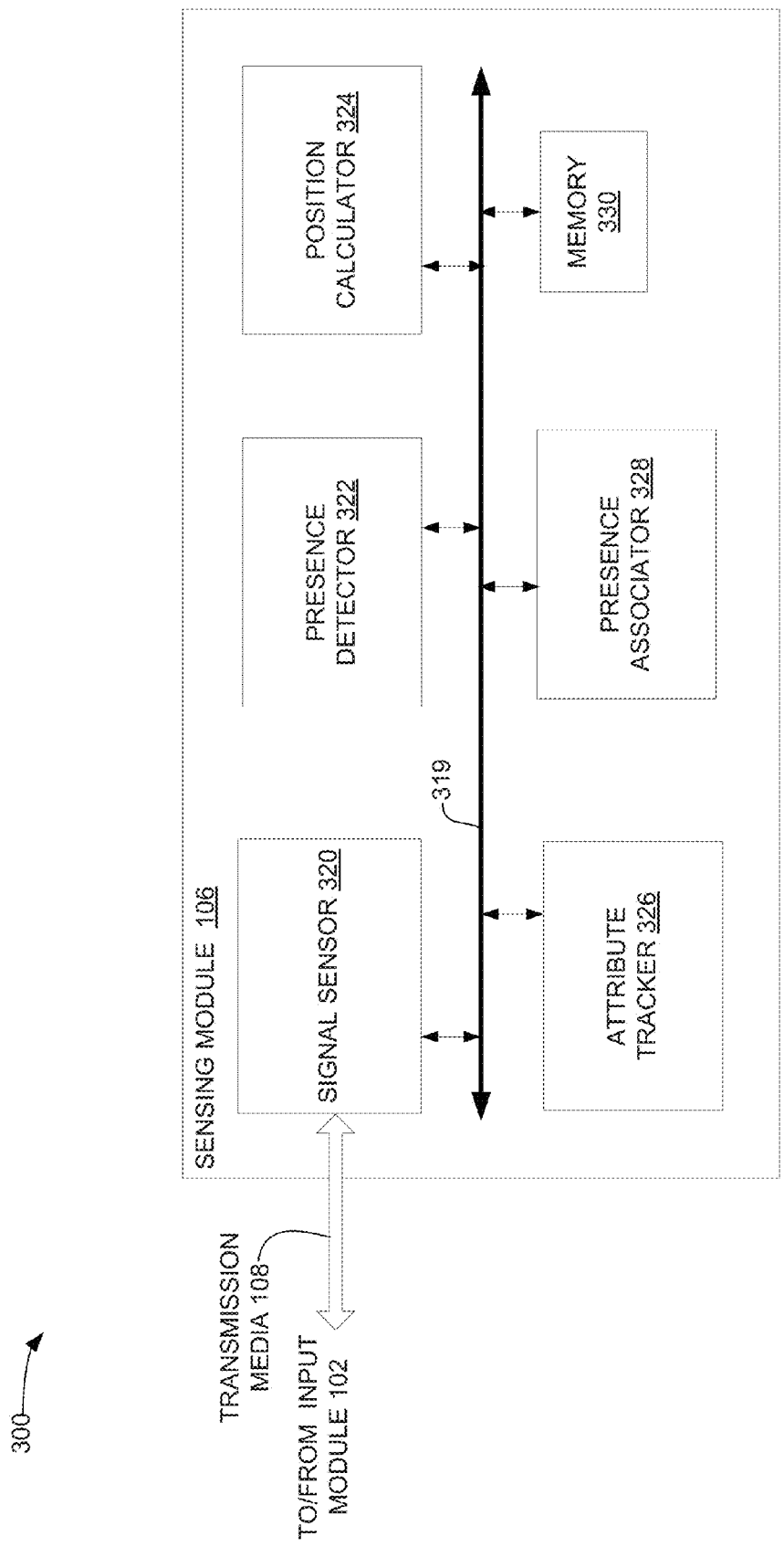
FIG. 3 is a block diagram illustrating a sensing module, in accordance with an embodiment.

FIG. 3 is a block diagram 300 illustrating the sensing module 106 of FIG. 1, in accordance with an embodiment. The sensing module 106 is shown to include a signal sensor 320, a presence detector 322, a position calculator 324, an attribute tracker 326, and a memory 330 coupled to one another through a bus 319, which each may be implemented using hardware, software, or a combination of hardware and software.

The signal sensor 320 of FIG. 3 is to communicate with the input module 102 of FIG. 1 over the transmission media 108 of FIG. 1 to detect capacitance of the sensor elements 104. For example, the signal sensor 320 may perform scan operations described above with respect to FIG. 1 to detect the capacitance. Alternatively or additionally, the signal sensor 320 may receive signals, responsive to the input object, reflecting pressure, light, and/or images of the input object. In an embodiment, some of the sensor elements 104 of FIG. 1 provide capacitance signals corresponding to an x-axis defined for the input module 102 of FIG. 1 and other of the sensor elements 104 provide capacitance signals corresponding to a y-axis defined for the input module 102 of FIG. 1. In an embodiment, the signal sensor 320 includes an analog-to-digital conversion circuit to convert analog capacitance signals to digital capacitance signals, which may be used by the presence detector 322 to detect presence.

The presence detector 322 is to detect a presence of a conductive object relative to the input module 102 of FIG. 1 using signals (e.g., digital signals) received from the signal sensor 320 of FIG. 3. The signals may reflect pressure, light, images, and or capacitances of detected through the signal sensors 104 of FIG. 1. Presence detection is discussed with respect to capacitive sensor elements for illustration and not limitations. The presence an input object may be detected using pressure sensor elements, light sensitive elements, light emitting elements, and/or image sensing elements in other embodiments. In an embodiment, the presence detector 322 detects the presence of a conductive object relative to the input module of FIG. 1 where a threshold change in capacitance is met or exceeded. For example, the presence detector 322 may detect the presence of three fingertips at the detected presences 211, 215, and 217 of FIG. 2, using one or more algorithms, which indicate levels of change in capacitance of capacitive sensor elements at those locations.

The presence detector 322 may represent a detected presence as a two-dimensional image. In an embodiment, the two-dimensional image may be defined by the capacitive sensor elements proximate to the conductive object and their changes in capacitance. In an embodiment, the image reflects a peak change in capacitance. An image of the detected presences 211 that may be generated by the presence detector 322 is discussed below with respect to FIG. 4.

An image of a detected presence and the associated signals that reflect changes in capacitance may be used to calculate position of a conductive object (e.g., by the position calculator 324, discussed below). Alternatively or additionally, the image and signals may be used as attributes of the detected presence. This and other attributes used to associate detected presences are discussed in more detail below with respect to FIG. 5.

The position calculator 324 is to calculate a position of each detected presence. The calculated position may be expressed as a point in an X-Y coordinate system defined for the input module 102 of FIG. 1. However, the position may be expressed with more or less than two-dimensions in other embodiments. In an embodiment, the position calculator 324 uses a centroid algorithm to determine a position on an axis (e.g., the x-axis or the y-axis) of the detected presence. The centroid algorithm may take, as input, the digital signals associated with a detected presence described above. The number of capacitive sensor elements providing input to the centroid algorithm can be adapted to meet design constraints. In an embodiment, centroid algorithms are used to calculate the centroid of the two-dimensional image of a detected presence determined by the presence detector 322.

The presence associator 328 is to determine whether one detected presence is associated with another detected presence. For example, referring to FIG. 2, the presence associator 328 may determine whether the detected presence 213 is associated with the detected presence 211, 215, or 217. In various embodiments, the presence associator 328 may associate detected presences before the position calculator 324 calculates their positions or after the position calculator 324 calculates their positions.

To determine whether two detected presences are associated with one another, the presence associator 328 evaluates a level of similarity between the detected presences. The level of similarity between the detected presences can be estimated based on a level of similarity between attribute values of each detected presence. The presence associator 328 may receive the attribute values through the attribute tracker 326, which is discussed below. In an embodiment, the presence associator 328 may generate a similarity value that represents the level of similarity between two detected presences. The similarity value is based on a difference (e.g., a change) in attribute values of a previously detected presence and a subsequently detected presence. Equation (1) below is but one example function that may be used to describe a difference between attribute values of a previously detected presence and a subsequently detected presence, and is as follows:

$$C_A(A_P, A_S) = A_P - A_S / A_P \qquad (1),$$

where $C_A(A_P, A_S)$ represents a function for determining a change in an attribute value $C_A$, $A_P$ represents the previous attribute value, and $A_S$ represents the subsequent attribute value.

The resulting change in attribute value $C_A$ may be used directly to calculate a similarity value or the absolute value of the difference may be used. The change in attribute value $C_A$ could be squared to exaggerate error. Depending on the attribute, the change in attribute value $C_A$ could also be expressed as a percentage.

Equation (2) is but one example function that may be used to calculate a similarity value reflecting a level of similarity between a previous detected presence and a subsequently detected presence, and is as follows:

$$\text{Similarity value} = k_1 * (1 - C_{A1}) + k_2 * (1 - C_{A2}) + \ldots k_n * (1 - C_{An}) \qquad (2),$$

where $k_1$ through $k_n$ each represent a weight factor assigned to each of the first attribute value through the $n^{th}$ attribute value, and $C_{A1}$ through $C_{An}$ each represent the change in the first attribute value through the change in the $n^{th}$ attribute value.

Each attribute may be assigned a weight factor (k) to increase or decrease the attribute's effect on the similarity value. For example, an attribute value that is expected to be reported with a certain (e.g., relatively high) level of error may be assigned less weight so that the effect of the error on the similarity value will be decreased. Attribute values that are expected to be more accurate or that are better indicators of similarity can be assigned more weight. For example, when width and height of a finger are expected to be determined with less accuracy than signal strength and position, the latter two attributes may be assigned greater weights. In an embodiment, the weight assigned to an attribute reflects the confidence a system designer has in determined attribute values. For example, if there is low confidence in a width and/or height measurement (e.g., low confidence in the measurement technique), each of those features may be assigned a low weight. An example evaluation of the similarity value equation of equation (2) is discussed with respect to FIG. 7.

The attribute tracker 326 is to determine (e.g., receive and/or generate) attribute values corresponding to detected presences of a conductive object. The attribute tracker 326 may place the determined attribute values in the memory 330 to make them available for the presence associator 328, which determines the similarity between detected presences.

Different attributes are available to be determined at different times during the presence detection and position calculation processes. As such, the attribute tracker 326 may receive and/or generate attribute values of a detected presence at different times according to the progression of the sensing module 106 of FIG. 1 in the presence detection and position calculation processes.

Figure 4:
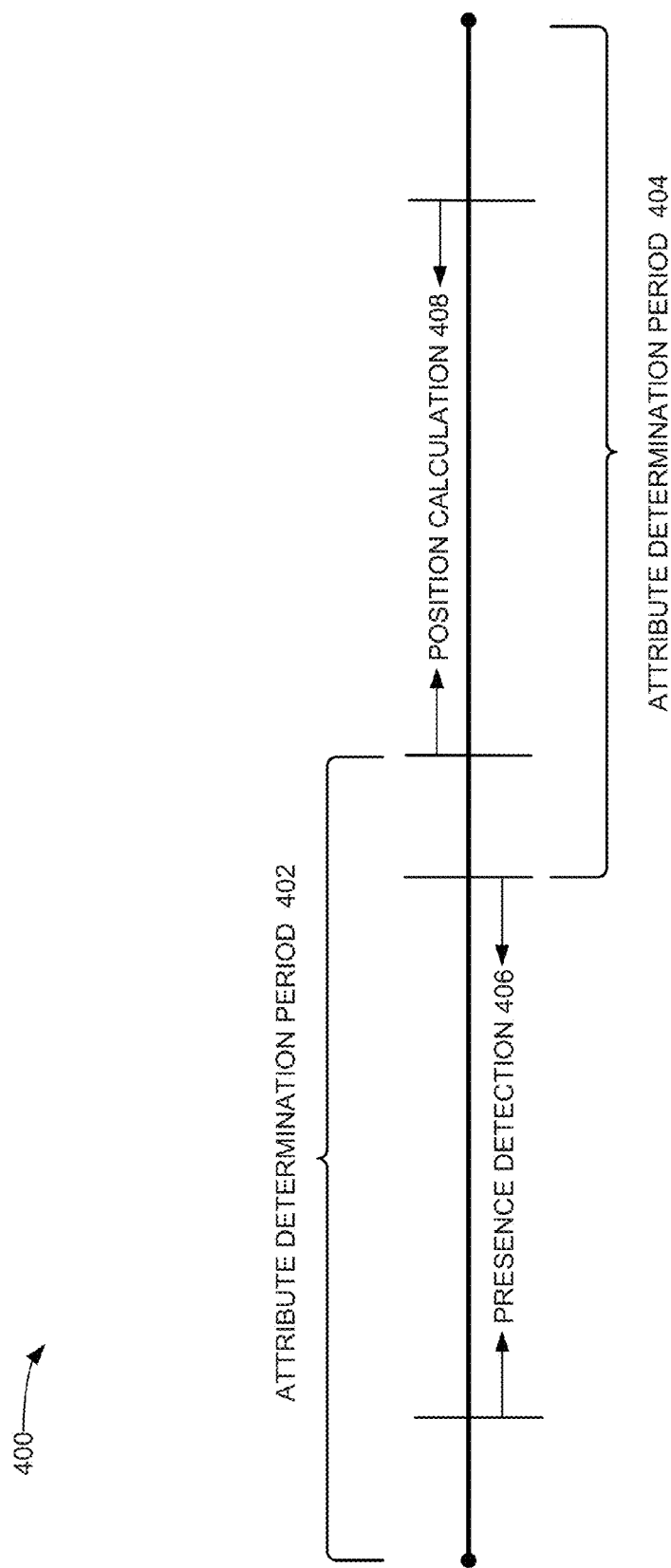
FIG. 4 is a timing diagram illustrating attribute determination periods, in accordance with an embodiment.

FIG. 4 is a timing diagram 400 illustrating attribute determination periods 402 and 404, in accordance with an embodiment. FIG. 4 shows that the attribute tracker 326 may be determine attribute values during the attribute determination period 402 and/or during the attribute determination period 404. The attribute determination period 402 is shown to occur prior to position calculation 408 while the attribute determination period 404 is show to occur after presence detection 406. In various embodiments, the attribute determination period 402 may occur prior to presence detection, during presence detection, and/or after presence detection 406. In various embodiments, the attribute determination period 404 may occur prior to position calculation 408, during position calculation 408, and/or after position calculation 408. Example attribute determination periods are specified for the example attributes described below.

Figure 5:
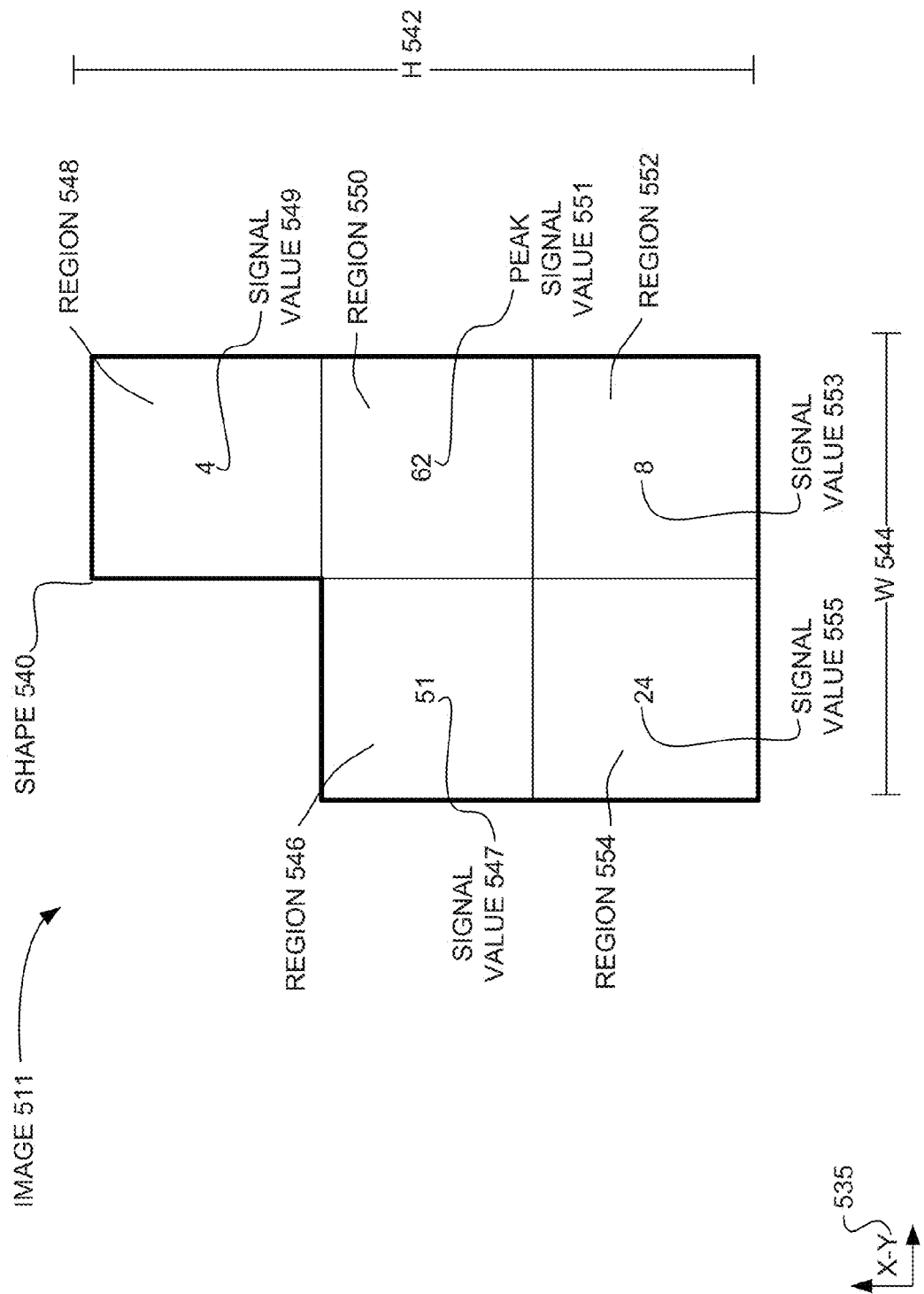
FIG. 5 is block diagram illustrating an example image representing a detected presence, in accordance with an embodiment.

FIG. 5 is block diagram illustrating an example image 511 representing a detected presence, in accordance with an embodiment. The presence detector 322 of FIG. 3 may generate the image 511 as a representation of the detected presence 211 of FIG. 2. The image 511 is shown to include a shape 540. The shape 540 is indicated with a bold perimeter line. The shape 540 is shown to include a height 542 and a width 544. A number of regions 546, 548, 550, 552, and 554 are shown within the shape 540. In an embodiment, each region 546, 548, 550, 552, and 554 is associated with a number of the sensor elements 104 of FIG. 1 from which signals reflecting capacitance are received by the signal sensor 320 of FIG. 1. The region 550 is shown to include a peak signal value 551 of 62 and the other regions 546, 548, 552, and 554 are shown to include the signal values 547, 549, 553, and 555 of 51, 4, 8, and 24, respectively. The peak signal value 551 and the other signal values 547, 549, 553, and 555 each represent a change in capacitance of the capacitive sensor elements associated with their corresponding region.

As introduced above, a detected presence can be characterized with attributes that are useful for associating a subsequently detected presence with a previously detected presence. The more attributes used to describe a detected presence the more unique the description can become. The example attributes described with respect to the image 511 may similarly be used to describe numerous other detected presences.

The shape of an image may be used as an attribute of a detected presence. The number of capacitive sensor elements a conductive object (e.g. a finger) interacts with is directly related to the size of the conductive object, thus, the effected capacitive sensor elements define the shape of the image. In various embodiments, shape attributes are determined by the attribute tracker 326 during the attribute determination period 402 discussed with respect to FIG. 4.

In an embodiment, different attribute values may be assigned to different shapes (e.g., an ellipse, a rectangle, a triangle, other shapes, or some combination or portion of any shape). A shape's rotation about an axis and its scale or size may also be used as a shape attribute. In an embodiment, rotation of the shape and the scale of the shape may be useful in associating a subsequently detected presence with a previously detected presence where the subsequently detected presence is the same shape but has changed in rotation or scale. Alternatively or additionally, the height 542 and/or the width 544 of the shape may be used as an attribute of a detected presence.

Signal values associated with an image may be used as attributes of a detected presence. One signal value related attribute includes the peak signal value, which is referred to as the touch intensity. The touch intensity of the image 511 is the peak signal value of 62. Another signal value related attribute is the sum of signal values associated with an image. This attribute may be referred to as a touch mass of the image. For example, the touch mass of the image 511 is the sum of the peak signal value 511 and the signal values 547, 549, 553, and 555, which is equal to 152.

Each region 546, 548, 550, 552, and 554 may be assigned one or more contour curves (not shown) that represent a height or elevation equal to the signal value of that region. In an embodiment, the attribute tracker 326 of FIG. 326 assigns these contours during the attribute determination period 402 described with respect to FIG. 4. In this way, the image 511 can be thought of as a contour map describing three-dimensions that can be used as an attribute to describe a detected presence. Another way to describe a three-dimensional shape of the image 511 is through the slope of a line from the regions 548, 552, 554, and 556 with the smaller signal values to the region 550 with the peak signal value. In an embodiment, an orientation of the detected presence can be estimated based on the contours or signal slopes of its image. In an embodiment, the orientation of a detected presence indicates a direction in which the conductive object points towards the surface of the input module. It will be noted that the direction that the conductive object is pointed may not necessarily indicate the direction that the conductive object is moving or the direction it will be moved. An orientation of the detected presence may be used as an attribute of a detected presence.

A position of an image relative to the input module 102 may be may be used as an attribute of a detected presence. The position of the image 511 may be determined by the position calculator 324 of FIG. 3 during the attribute determination period 404 described with respect to FIG. 4. In an embodiment, the position may be expressed with an x-value and/or a y-value (e.g., an ordered pair) of the x-y coordinate system 535 of FIG. 5. A velocity associated with an image may be used as an attribute of a detected presence. The velocity can be determined through two or more calculated positions of detected presence and the time it takes the conductive object to move between the calculated positions. The velocity associated with the image 511 may be determined during the attribute determination period 404 described with respect to FIG. 4.

Yet another example attribute of a detected presence may include a pressure measurement associated with the detected presence that reflects a contact pressure between a conductive object and an input surface. One having ordinary skill in the art will recognize that numerous other attributes of detected presence, in addition to the example attributes discussed above, may be used to describe detected presence and be used in other embodiments. Alternatively or additionally, combinations of the attributes described above and/or other attributes may be used as attributes of a detected presence. For example, the attribute tracker 326 of FIG. 3 may implement an algorithm that takes, as input, the shape attribute, the orientation attribute, and the position attribute to output an attribute value that describes the detected presence. Example attribute values for the detected presences 211, 213, 215, and 217 and calculated similarity values are discussed with respect to FIG. 7.

Figure 6:
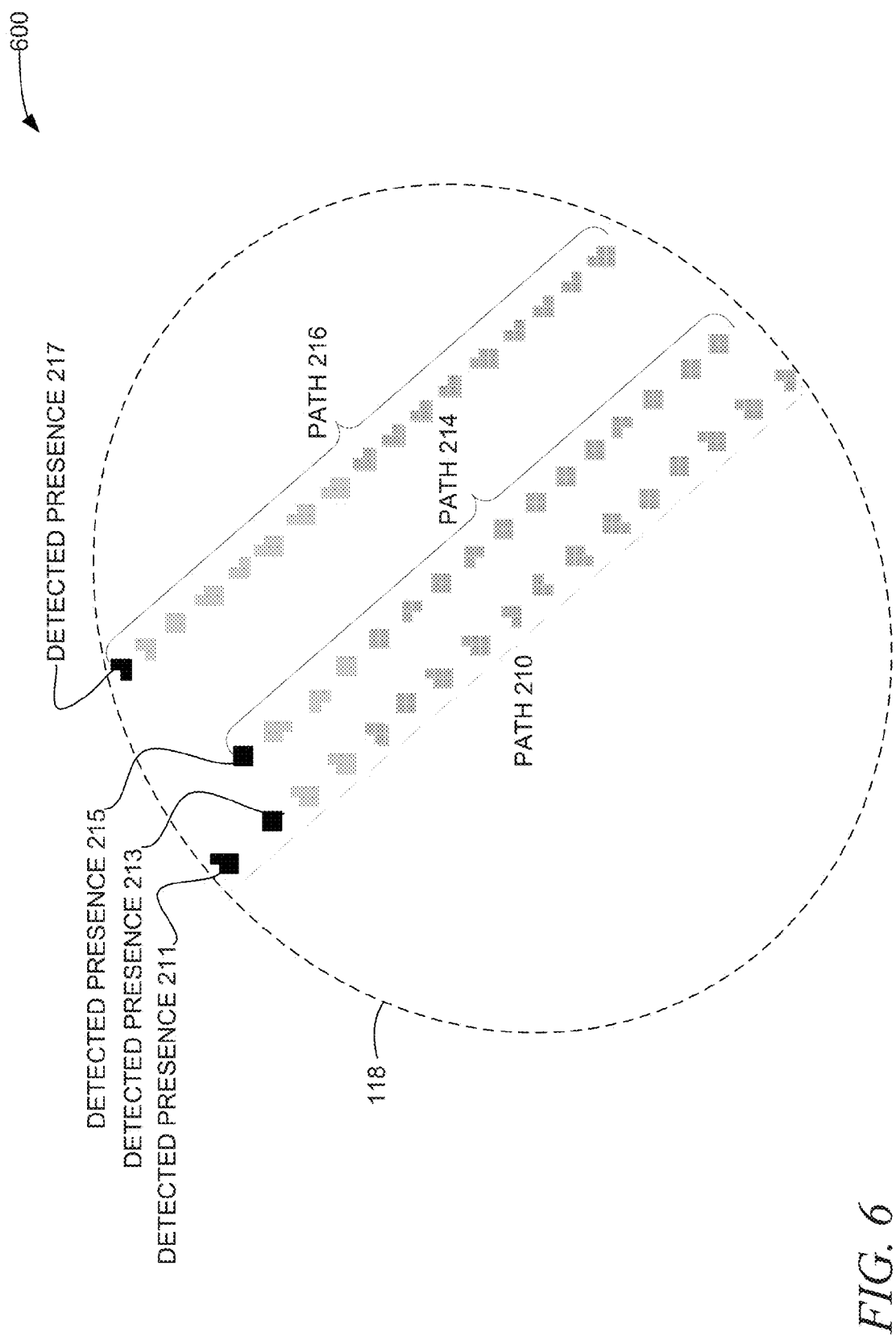
FIG. 6 is a block diagram illustrating a view of multiple detected presences, in accordance with an embodiment.

FIG. 6 is a block diagram 600 illustrating a view of multiple detected presences 211, 213, 215, and 217, in accordance with an embodiment. FIG. 6 is shown to include the encircled portion 118 of FIGS. 1 and 2. The encircled portion 118 of FIG. 6 is shown to include the detected presences 211, 213, 215, and 217 as darkened shapes, which are the focus of discussion of FIG. 7, while the remaining detected presences are shown as lightened shapes. In an example embodiment, the presence associator 328 of FIG. 3 is to determine which one of the previously detected presences 211, 215, and 217 is associated with the detected presence 213. The same or similar techniques as described herein may be used to associate other detected presences.

FIG. 7 is a chart 700 showing attribute values and a similarity value associated with multiple detected presences 211, 215, 217, and 213, in accordance with an embodiment. The chart is shown to include a detected presence column 702, an identifier column 704, attributes columns 706, and a similarity value column 708.

The detected presence column 702 is shown to include the detected presences 211, 215, 217, and 213 of FIG. 6. The identifier column 704 includes numerical identifiers for each of the detected presences 211, 215, 217, and 213. In an embodiment, a touch identifier is assigned to a detected presence once the position calculator 324 of FIG. 3 has calculated the position. Attribute values corresponding to width, height, mass (e.g., sum of signals), peak (e.g., peak signal), x-coordinate, and y-coordinate are provide for each detected presence in the attributes columns 706. The similarity value column 708 shows a similarity value for each detected presence 211, 215, 217, and 213.

The similarity value indicates a similarity between each previously detected presence 211, 215, 217 and the subsequently detected presence 213. In an embodiment, the presence associator 328 of FIG. 3 uses equation (2) to calculate the similarity values and associates the subsequently detected presence with the previously detected presence having the highest similarity value. In this example, a weight of 0.25 is applied to the width and height attributes, a weight of 0.75 is applied to the position attributes, a weight of 1.25 is applied to the peak signal attribute, and a weight of 1.75 is applied to the mass attribute. For the purpose of illustration, the similarity value column 708 also shows an example maximum similarity value (e.g., similarity score=5.00) that reflects the similarity of the subsequently detected presence 213 to itself.

Other than the maximum similarity value, the greatest similarity value in the similarity value column 708 is shown to be 4.23, which corresponds to the similarity between the previously detected presence 211 and the subsequently detected presence 213. The next highest similarity value is shown to be 3.98, which corresponds to the similarity between the previously detected presence 215 and the subsequently detected presence 213. In this example, because 4.24 is the greatest similarity value, the presence associator 328 of FIG. 3 associates the subsequently detected presence 213 with the previously detected presence 211 to the exclusion of the other previously detected presences 215 and 217.

It may be noted that the Euclidean distance between the previously detected presence 215 and the subsequently detected presence 213 (e.g., around 8.5 units) is less than the Euclidean distance between the previously detected presence 211 and the subsequently detected presence 213 (e.g., around 14.4 units). If detected presences were associated based only on the shortest distance between them, the subsequently detected presence 213 would have incorrectly been associated with the previously detected presence 215. It may further be noted that the previously detected presence 215 appears to be more similar in shape to the subsequently detected presence 213 than the previously detected presence 211. However, through the use of multiple weighted attributes, the presence associator 328 of FIG. 3 is able to associate the most similar detected presences 211 and 213 with one another. Although weights are used in the example above, other embodiments may accurately associated detected presences without the use of weights.

Figure 8:
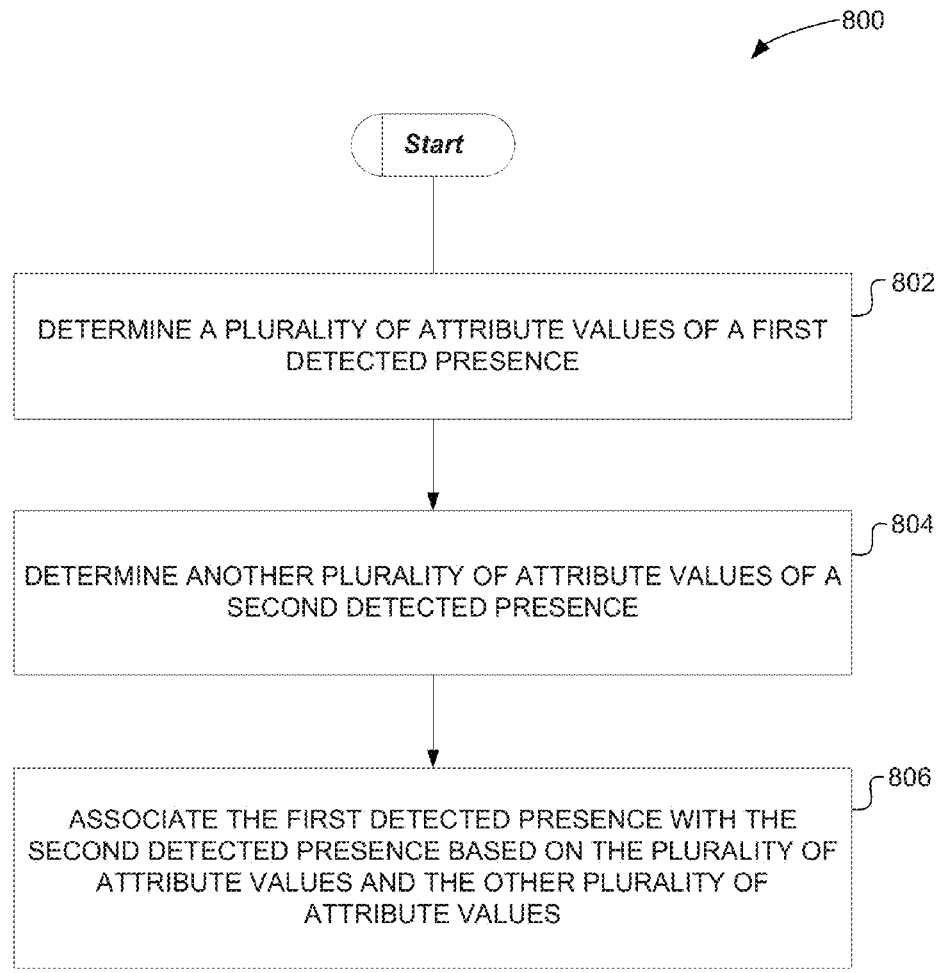
FIG. 8 is a flow diagram illustrating a method 800 for associating a detected presence of a conductive object, in accordance with an embodiment.

FIG. 8 is a flow diagram illustrating a method 800 for associating a detected presence of a conductive object, in accordance with an embodiment. A description of the method 800 refers to components of drawings referred to above for the purpose of explanation and not to limit the claimed subject matter. It will be noted that the methods described herein may be performed by hardware, software, or a combination of hardware and software.

At block 802, the method 800 may include the attribute tracker 326 of FIG. 3 determining a plurality of attribute values of the detected presence 211 of FIG. 2, and at block 804, the method 800 may include the attribute tracker 326 of FIG. 3 determining another plurality of attribute values of the detected presence 213 of FIG. 2.

An attribute value may reflect a quality or a quantity of an attribute. In various embodiments, the attributes of the detected presences 211 and 213 of FIG. 2 may include, but not be limited to, a two-dimensional shape of detected presence (e.g., mass of a detected presence), a sum of signal values reflecting detected presence, a peak signal value of detected presence, an orientation of detected presence, a three-dimensional shape of detected presence, a position of detected presence, and a velocity of detected presence.

In an embodiment, the presence detector 322 of FIG. 3 detects the detected presence 211 of FIG. 2 before the presence detector 322 of FIG. 3 detects the detected presence 213 of FIG. 2, and the position calculator 324 of FIG. 3 calculates a position of the detected presence 211 of FIG. 2 before the position calculator 324 of FIG. 3 calculates a position of the detected presence 213.

The attribute tracker 326 of FIG. 3 may determine attribute values at different times relative to presence detection and position calculation processes depending on what attribute is being determined. For example, the attribute tracker 326 may determine and store in the memory 330 a peak signal value of the detected presence 213 of FIG. 2 before the position calculator 324 of FIG. 3 calculates a position of the detected presence 213 of FIG. 2, and the attribute tracker 326 of FIG. 3 may determine and store in the memory 330 a velocity associated with the detected presence 213 after the presence detector 322 detects the position of the detected presence 213 of FIG. 2.

Returning to FIG. 8, at block 806, the method 800 may include the presence associator 328 of FIG. 3 associating the detected presence 211 of FIG. 2 with the detected presence 213 of FIG. 2 based on the plurality of attribute values and the other plurality of attribute values. In an embodiment, the presence associator 328 of FIG. 3 associates the detected presence 211 of FIG. 2 with the detected presence 213 of FIG. 2 based on a level of similarity between the plurality of attribute values and the other plurality of attribute values, which are received from the attribute tracker 326 through the memory 330. The presence associator 328 may calculate a similarity value that reflects the level of similarity between the plurality of attribute values and the other plurality of attribute values. For example, the presence associator 328 of FIG. 3 may determine differences between attribute values (e.g., see equation (1)) of the detected presence 211 of FIG. 2 and the detected presence 213 of FIG. 2 and then calculate the similarity value (e.g., see equation (2)) based on a sum of the differences between the attribute values.

In an embodiment, the presence associator 328 of FIG. 3 uses the attribute values to exclude detected presences from being associated with one another. For example, the presence associator 328 may not associate the detected presence 213 of FIG. 2 with the detected presence 215 of FIG. 2 based on a lack of similarity between a further plurality of attribute values of the detected presence 215 and the other plurality of attribute values of the detected presence 213.

For a capacitive sensing system that can simultaneously detect multiple touches, the techniques to accurately associate touches and accurately exclude association of touches, as described through the embodiments herein, provides for accurate interpretation of input. Associated touches input such as gestures, and the like, can be used as input to a variety of user interface functions of operating systems, drawing applications, business applications, game applications, industrial applications, or any other programs that can utilize the associated touch input.

By describing touches with multiple touch attributes and determining their similarity based on the touch attributes, false positive associations and false negative exclusion of associations are avoided. Taking the previously detected touch and the subsequently detected touch as an example, other tracking techniques may exclude their association when the distance between them exceeds a threshold distance. Through embodiments described herein, since multiple attributes are used to describe a touch, overall similarities between the previously detected touch and the subsequently detected touch can be recognized so that the touches will be correctly associated.

Figure 9:
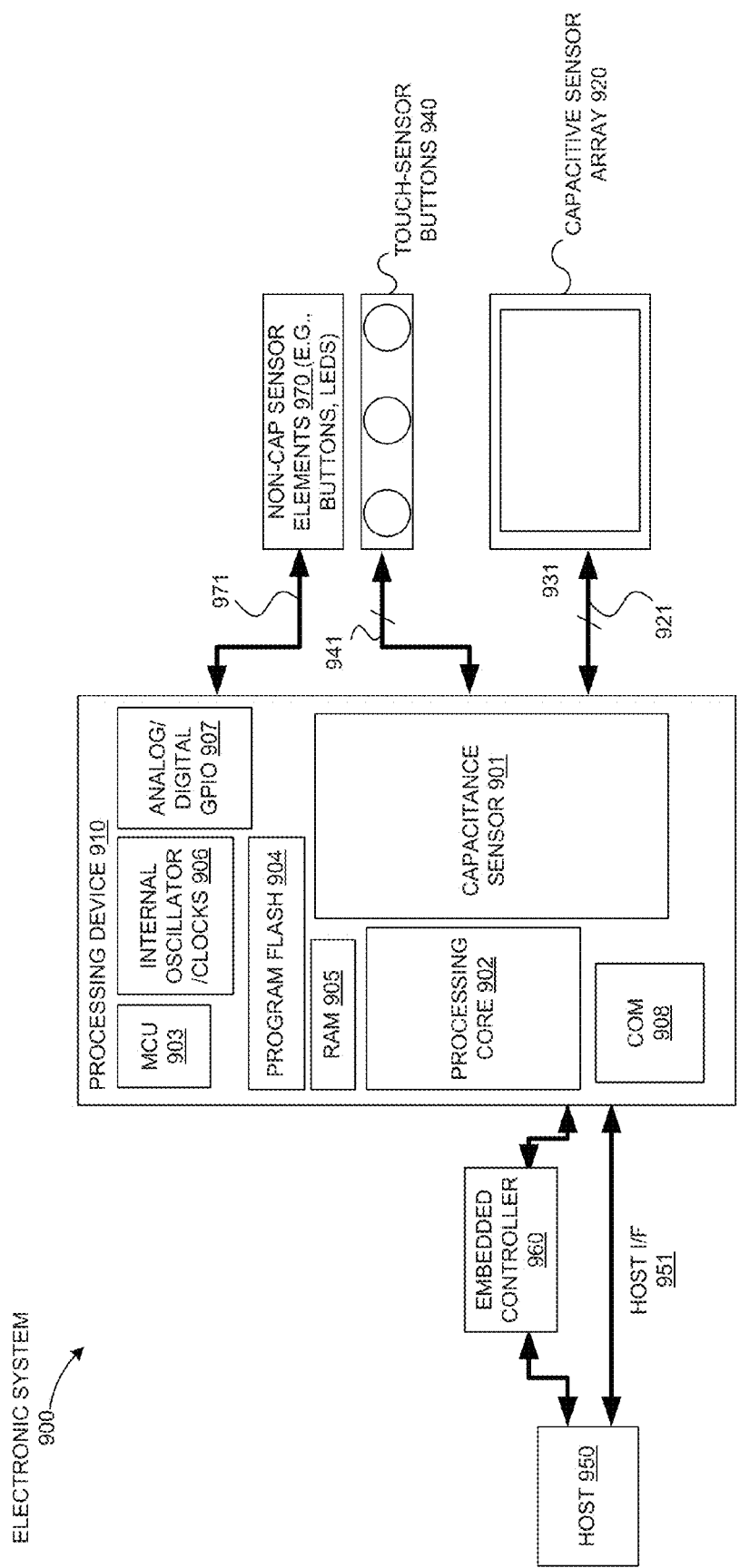
FIG. 9 is a block diagram illustrating an electronic system to detect a presence of a conductive object on a capacitive sensor array, in accordance with various embodiments.

FIG. 9 is a block diagram illustrating an electronic system 900 to detect a presence of a conductive object on a capacitive sensor array 920, in accordance with various embodiments.

The electronic system 900 includes a processing device 910, the capacitive sensor array 920, touch-sensor buttons 940, host processor 950, embedded controller 960, and non-capacitance sensor elements 970. The processing device 910 may include analog and/or digital general purpose input/output ("GPIO") ports 907. GPIO ports 907 may be programmable. The digital block array may be configured to implement a variety of digital logic circuits (e.g., DACs, digital filters, or digital control systems) using, in one embodiment, configurable user modules ("UMs"). The digital block array may be coupled to a system bus. Processing device 910 may also include memory, such as random access memory ("RAM") 905 and program flash 904. RAM 905 may be static RAM ("SRAM"), and program flash 904 may be a non-volatile storage, which may be used to store firmware (e.g., control algorithms executable by processing core 902 to implement operations described herein). Processing device 910 may also include a microcontroller unit ("MCU") 903 coupled to memory and the processing core 902.

As illustrated, capacitance sensor 901 may be integrated into processing device 910. Capacitance sensor 901 may include analog I/O for coupling to an external component, such as capacitive sensor array 920, touch-sensor buttons 940, and/or other devices. Capacitance sensor 901 and processing device 910 are described in more detail below.

The embodiments described herein can be used in any capacitive sensor array application, for example, the capacitive sensor array 920 may be a touch screen, a touch-sensor slider, or touch-sensor buttons 940 (e.g., capacitance sensor buttons). The operations described herein may include, but not be limited to, notebook pointer operations, lighting control (dimmer), volume control, graphic equalizer control, speed control, or other control operations requiring gradual or discrete adjustments. It will also be noted that these embodiments of capacitive sense implementations may be used in conjunction with non-capacitive sensor elements 970, including but not limited to pick buttons, sliders (ex. display brightness and contrast), scroll-wheels, multi-media control (ex. volume, track advance, etc) handwriting recognition and numeric keypad operation.

In one embodiment, the electronic system 900 includes a capacitive sensor array 920 of sensor elements coupled to the processing device 910 via bus 921. In an embodiment, the capacitive sensor array may include sensor elements 104 of FIG. 1. The capacitive sensor array 920 of the sensor elements may include a one-dimensional sensor array in one embodiment and a two dimensional sensor array in another embodiment. Alternatively or additionally, the capacitive sensor array 920 of the sensor elements may have more dimensions. Also, in one embodiment, the capacitive sensor array 920 of the sensor elements may be sliders, touchpads, touch screens or other sensing devices. In another embodiment, the electronic system 900 includes touch-sensor buttons 940 coupled to the processing device 910 via bus 941. Touch-sensor buttons 940 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 940 may have a single sensor element to detect the presence of the conductive object. In one embodiment, touch-sensor buttons 940 may include a capacitive sensor element. Capacitive sensor elements may be used as non-contact sensor elements. These sensor elements, when protected by an insulating layer, offer resistance to severe environments.

The electronic system 900 may include any combination of one or more of the capacitive sensor array 920, and/or touch-sensor button 940. In another embodiment, the electronic system 900 may also include non-capacitance sensor elements 970 coupled to the processing device 910 via bus 971. The non-capacitance sensor elements 970 may include buttons, light emitting diodes ("LEDs"), and other user interface devices, such as a mouse, a keyboard, or other functional keys that do not require capacitance sensing. In one embodiment, busses 971, 941, 931, and 921 may be a single bus. Alternatively, these buses may be configured into any combination of one or more separate buses.

Processing device 910 may include internal oscillator/clocks 906 and communication block ("COM") 908. The oscillator/clocks block 906 provides clock signals to one or more of the components of processing device 910. Communication block 908 may be used to communicate with an external component, such as a host processor 950, via host interface ("I/F") line 951. Alternatively, processing device 910 may also be coupled to the embedded controller 960 to communicate with the external components, such as host processor 950. In one embodiment, the processing device 910 is configured to communicate with the embedded controller 960 or the host processor 950 to send and/or receive data.

Processing device 910 may reside on a common carrier substrate such as, for example, an integrated circuit ("IC") die substrate, a multi-chip module substrate, or the like. Alternatively, the components of processing device 910 may be one or more separate integrated circuits and/or discrete components. In one exemplary embodiment, processing device 910 may be the Programmable System on a Chip ("PSoC®") processing device, developed by Cypress Semiconductor Corporation, San Jose, Calif. Alternatively, processing device 910 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It will also be noted that the embodiments described herein are not limited to having a configuration of a processing device coupled to the host processor 950, but may include a system that measures the capacitance on the sense device and sends the raw data to another host computer where it is analyzed by an application. In effect, the processing that is done by processing device 910 may also be done in the host computer.

It is noted that the processing device 910 of FIG. 9 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth). In some embodiments, the processing device 910 may provide multi-touch capability through simultaneously detecting multiple conductive objects proximate to different regions of the capacitive sensor array 920. In an embodiment, the processing device 910 may include and/or provide the functionality of one or more of the signal sensor 320, the presence detector 322, the position calculator 324, the attribute tracker 326, and the presence associator 328 as described above with respect to FIG. 3.

Capacitance sensor 901 may be integrated into the IC of the processing device 910, or alternatively, in a separate IC. The capacitance sensor 901 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 901 may be generated and compiled for incorporation into other integrated circuits. For example, behavioral level code describing capacitance sensor 901, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 901.

It will be noted that the components of the electronic system 900 may include only some or all the discrete components described above, or some combination thereof.

In one embodiment, electronic system 900 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Methods and apparatus to associate a detected presence of a conductive object have been described. Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document controls.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method of associating presences that are previously and subsequently detected by a touch sensing module, comprising:
   detecting a first presence during a first scan performed at a first time, including obtaining a first plurality of signal values associated with the first presence;
   determining a first plurality of attribute values for a set of attributes associated with the first detected presence according to the first plurality of signal values, wherein the set of attributes includes at least one of: a two-dimensional shape, a sum of signal values, a peak signal value, a three-dimensional shape, and a velocity of a corresponding detected presence;
   detecting a second presence during a second scan performed at a second time that is subsequent to the first time, including obtaining a second plurality of signal values associated with the second presence;
   determining a second plurality of attribute values for the set of attributes associated with the second detected presence according to the second plurality of signal values;
   determining a plurality of differences for the set of attributes based on the first and second plurality of attribute values;
   determining a similarity level between the first and second presences, including
   combining the plurality of differences according to a plurality of weight factors;
   when the similarity level satisfies a predetermined criterion:
   associating the first detected presence with the second detected presence; and
   determining a path of a conductive object based on the association of the first detected presence with the second detected presence, comprising:
   determining that the conductive object is located at a first position of the first detected presence at the first time; and
   determining that the conductive object is located at a second position of the second detected presence at the second time.

2. The method of claim 1, wherein the set of attributes includes at least two of: a two-dimensional shape of detected presence, a sum of signal values reflecting detected presence, a peak signal value of detected presence, an orientation of detected presence, a three-dimensional shape of detected presence, a position of detected presence, and a velocity of detected presence.

3. The method of claim 2, wherein determining the first plurality of attribute values for the set of attributes associated with the first detected presence includes:
   determining a first attribute value of the first plurality of attribute values before a position of the first detected presence is calculated; and
   determining a second attribute value of the first plurality of attribute values after the position of the first detected presence is calculated;
   wherein determining the second plurality of attribute values for the set of attributes associated with the second detected presence includes:
   determining a first attribute value of the other plurality of attribute values before a position of the second detected presence is calculated; and
   determining a second attribute value of the other plurality of attributes after the position of the second detected presence is calculated.

4. The method of claim 1, further comprising excluding an association between the second detected presence and a third detected presence based on a third plurality of attribute values for the set of attributes associated with the third detected presence and the second plurality of attribute values of the second detected presence.

5. The method of claim 1, wherein the similarity level is determined based on a level of similarity between the first plurality of attribute values and the second plurality of attribute values.

6. The method of claim 1, wherein the similarity level is determined based on a sum of the plurality of differences.

7. An apparatus comprising:
   a processing device further comprising:
   (1) an attribute tracker configured to:
   determining a first plurality of attribute values for a set of attributes associated with a first detected presence according to a first plurality of signal values, wherein the first presence is detected during a first scan performed at a first time, wherein the set of attributes includes at least one of: a two-dimensional shape, a sum of signal values, a peak signal value, a three-dimensional shape, and a velocity of a corresponding detected presence; and determining a second plurality of attribute values for the set of attributes associated with a second detected presence according to a second plurality of signal values, wherein the second presence is detected during a second scan performed at a second time that is subsequent to the first time;

(2) a presence associator coupled with the attribute tracker and configured to:

determine a plurality of differences for the set of attributes based on the first and second plurality of attribute values;

determine a similarity level between the first and second presences, including combining the plurality of differences according to a plurality of weight factors; and when the similarity level satisfies a predetermined criterion:

associate the first detected presence with the second detected presence;

and determine a path of a conductive object, wherein the path includes a first position of the first detected presence on the path and a second position of the second detected presence, and that the conductive object is located at the respective position of the first and second detected presences at the first and second times, respectively.

8. The apparatus of claim 7, wherein the set of attributes includes at least two of: a two-dimensional shape of detected presence, a sum of signal values reflecting detected presence, a peak signal value of detected presence, an orientation of detected presence, a three-dimensional shape of detected presence, a position of detected presence, and a velocity of detected presence.

9. The apparatus of claim 7, further comprising:

a presence detector coupled with the attribute tracker, the presence detector configured to detect the first detected presence before the presence detector detects the second detected presence; and a position calculator coupled with the presence detector, the position calculator configured to calculate a position of the first detected presence before the position calculator calculates the position of the second detected presence.

10. The apparatus of claim 9, wherein the attribute tracker is configured to:

determine at least one of the plurality of attribute values of the second detected presence before the position calculator calculates the position of the second detected presence; and determine at least another of the plurality of attribute values of the second detected presence after the presence detector detects the second presence.

11. The apparatus of claim 7, wherein the presence associator is configured to exclude an association of the second detected presence with a third detected presence based on a third plurality of attribute values for the set of attributes associated with the third detected presence and the second plurality of attribute values of the second detected presence.

12. The apparatus of claim 7, wherein the presence associator is configured to associate the first detected presence with the second detected presence at least partially based on a level of similarity between the first plurality of attribute values and the second plurality of attribute values.

13. The apparatus of claim 12, wherein the presence associator is configured to determine the similarity level based on the level of similarity between the first plurality of attribute values and the second plurality of attribute values.

14. The apparatus of claim 7, wherein the presence associator is configured to determine the similarity level based on a sum of the plurality of differences.

15. A sensing system comprising:

a plurality of sensor elements configured to detect a first plurality of touch presences during a first plurality of scans performed at a first plurality of times and a second touch presence during a second scan performed at a second time subsequent to the first plurality of times, respectively, wherein a respective first plurality of signal values is obtained for each of the first plurality of touch presences, and a second plurality of signal values is obtained for the second presence; and a processing device coupled to the plurality of sensor elements, the processing device further comprising:

(1) an attribute tracker configured to:

for each of the first plurality of touch presences, determine a respective first plurality of attribute values for a set of attribute values associated with the respective first touch presence according to the respective first, plurality of signal values, wherein the set of attributes includes at least one of: a two-dimensional shape, a sum of signal values, a peak signal value, a three-dimensional shape, and a velocity of a corresponding detected presence, and determine a second plurality of attribute values for the set of attribute associated with the second touch presence according to the second plurality of signal values; and (2) a presence associator configured to:

calculate a respective similarity value for each of the first plurality of touch presences based on a plurality of weight factors associated with the set of attributes, wherein the respective similarity value reflects a level of similarity between the respective first plurality of attribute values of the respective first touch presence and the second plurality of attributes values of the second touch presence; and when one of the similarity values satisfies a predetermined criterion:

associate one of the first plurality of touch presences with the second touch presence based on the similarity value associated with the one of the first plurality of touch presences;

determine a path traveled by the conductive object; and determine that a same conductive object made the one of the first plurality of touch presences at a first location on the path and the second touch presence at a second location on the path.

16. The sensing system of claim 15, wherein the set of attributes includes at least two of: a two-dimensional shape of a touch, a sum of signal values of the touch, a peak signal value of the touch, an orientation of the touch, a three-dimensional shape of the touch, a position of the touch, and a velocity of the touch.

17. The sensing system of claim 16, wherein the attribute tracker is configured to:

for each of the first plurality of touch presences:

determine a first attribute value of the respective first plurality of attribute values for a first attribute of the set of attributes before a position of the respective first touch presence is obtained;

determine a second attribute value of the respective first plurality of attribute values for a second attribute of the set of attributes after the position of the respective first touch presence is obtained; and determine a third attribute value of the second plurality of attribute values for the first attribute before a position of the second touch presence is calculated; and determine a fourth attribute value of the second plurality of attribute values for the first attribute after the position of the second touch presence is calculated.

18. The sensing system of claim 15, wherein the presence associator is configured to:

for each of the first plurality of touch presences:
determine a plurality differences for the set of attributes based on the respective first plurality of attribute values and the second plurality of attribute values; and determine the similarity value between the respective first touch presence and the second presence, including combining the plurality of differences according to the plurality of weight factors.

\* \* \* \* \*